United States Patent [19]
Kondo

[11] Patent Number: 5,293,380
[45] Date of Patent: Mar. 8, 1994

[54] FRAME SYNCHRONIZATION SYSTEM AMONG MULTIPLE RADIO BASE STATIONS FOR TDMA DIGITAL MOBILE COMMUNICATIONS SYSTEM

[75] Inventor: Seiji Kondo, Tokyo, Japan

[73] Assignee: NEC Corporation, Tokyo, Japan

[21] Appl. No.: 634,894

[22] Filed: Dec. 27, 1990

[30] Foreign Application Priority Data

Dec. 27, 1989 [JP] Japan .................... 1-336380

[51] Int. Cl.$^5$ ............................. H04L 7/00
[52] U.S. Cl. ................... 370/95.3; 370/108; 379/60; 455/33.2
[58] Field of Search ............ 370/95.1, 95.3, 108, 370/107, 106, 105.1, 17, 100.1, 104.1, 105.4, 105.5; 455/33, 13.2, 33.1, 33.2, 33.3, 33.4, 56.1, 54.1; 379/59, 60, 63

[56] References Cited

U.S. PATENT DOCUMENTS

| | | | |
|---|---|---|---|
| 3,879,580 | 4/1975 | Schlosser et al. | 320/95.3 |
| 4,129,755 | 12/1978 | Murakami | 370/105.1 |
| 4,513,416 | 4/1985 | Fujiwara | 370/104.1 |
| 4,714,899 | 12/1987 | Kurtzman et al. | 455/260 |
| 4,763,322 | 8/1988 | Eizenhofer | 370/95.1 |
| 4,765,753 | 8/1988 | Schmidt | 455/33 |
| 4,800,560 | 1/1989 | Aoki et al. | 370/108 |
| 4,947,452 | 8/1990 | Hattori et al. | 455/33 |
| 4,955,082 | 9/1990 | Hattori et al. | 370/95.1 |
| 4,972,410 | 11/1990 | Cohen et al. | 370/100.1 |
| 4,972,506 | 11/1990 | Uddenfeldt | 455/33 |

FOREIGN PATENT DOCUMENTS 0131862 1/1985 European Pat. Off. .
2095516 9/1982 United Kingdom .

OTHER PUBLICATIONS

IEEE Int. Conf. on Communications, Jun. 7-10, 1987, vol. 1, pp. 327-331, M. A. Lattore et al, "SMD 30/1'5: An advanced PMP TDMA radio system with powerful operation and maintenance facilities".
Electronics & Communications in Japan, vol. 67, No. 10, Oct. 1984, pp. 39-47, S. Sakata et al. "A PCM-TDMA one dimensional mobile communication system using leaky coaxial cables".

Primary Examiner—Benedict V. Safourek
Assistant Examiner—Melvin Marcelo
Attorney, Agent, or Firm—Sughrue, Mion, Zinn, Macpeak & Seas

[57] ABSTRACT

A TDMA digital mobile communications system prevents TDMA frame synchronization from being asynchronous among radio base stations when a communication held by a mobile station is handed over from one service area to another. A control station sends a reset pulse for TDMA frame synchronization to the radio base stations each being situated in a particular service area over communications cables. In response, the radio base stations each generates a TDMA frame. The control station has a synchronous signal generator for generating the reset pulse while each radio base station has a time delay adjustment unit for adjusting the time delay of the reset pulse. The synchronous signal generator and the time delay adjustment units of the individual radio base stations perform measurement and setting such that a reset signal has the same time delay between the control station and all of the radio base stations. Hence, regarding a TDMA signal which the mobile station receives, TDMA frame synchronization is immediately set up at the time of hand-over and thereby prevents a voice signal from being interrupted.

6 Claims, 5 Drawing Sheets

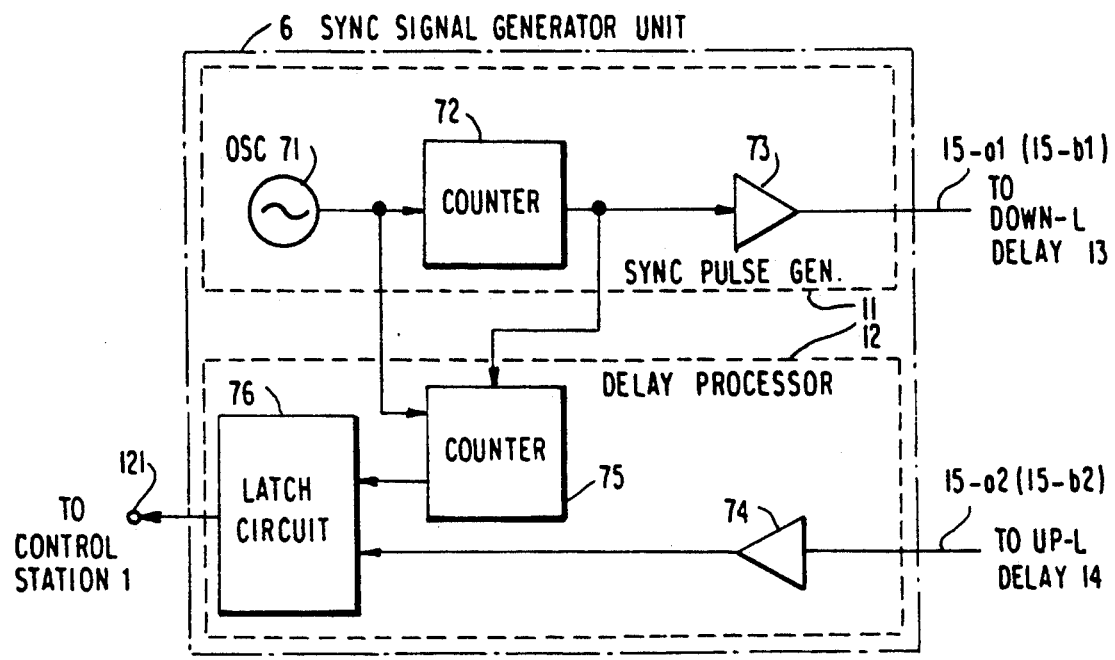
FIG. 7
FIG. 8
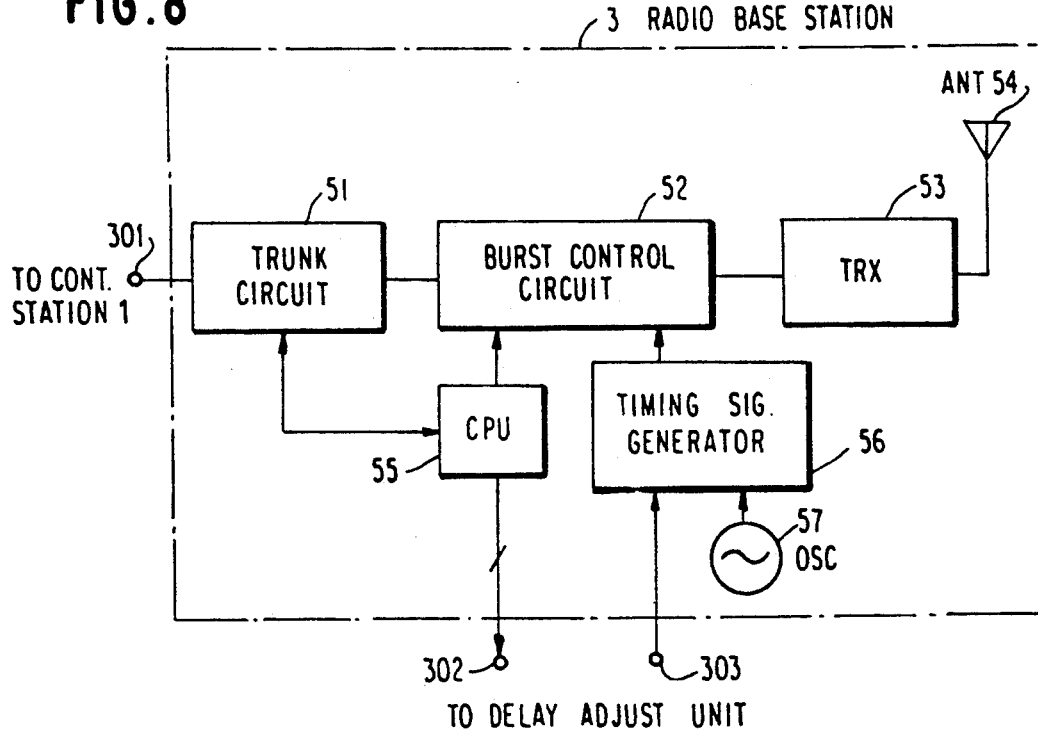

FRAME SYNCHRONIZATION SYSTEM AMONG MULTIPLE RADIO BASE STATIONS FOR TDMA DIGITAL MOBILE COMMUNICATIONS SYSTEM

BACKGROUND OF THE INVENTION

The present invention relates to a digital mobile communications system wherein mobile stations and a control station communicate via radio base stations each being located in a particular service area on a TDMA (Time Division Multiple Access) basis. More particularly, the present invention is concerned with a frame synchronization method among the radio base stations.

A TDMA digital mobile communications system of the type described usually has a control station and a plurality of radio base stations each being located in a particular service area. A number of mobile stations mounted on motor vehicles, for example, each communicates with the control station via one of the radio base stations existing in the service area where the mobile station itself is located, by using an assigned carrier and an assigned time slot.

When a given mobile station moves from a first service area covered by a first radio base station to a second service area covered by a second radio base station, it will communicate with the control station via the second radio base station thereafter.

Assume that when the mobile station moves as stated above, TDMA frame synchronization has not been established between the first and second radio base stations and the communication of the mobile station has to be handed over to the second radio base station. Then, the mobile station has to set up frame synchronization with the second radio base station before restarting the communication. To set up frame synchronization rapidly, TDMA frame generators installed in the individual radio base stations for generating TDMA frames may be reset at the same time.

Resetting a plurality of TDMA frame generators simultaneously as mentioned above may be implemented with a satellite which sends a reset signal to the individual radio base stations. Specifically, on receiving the reset signal, each radio base station resets the TDMA frame generator thereof for setting up frame synchronization. Such a system, however, is large scale and not practical since it needs not only a satellite but also a reset signal transmitter mounted on the satellite and a receiver built in each radio base station for receiving the reset signal from the satellite.

Thus, it has been difficult to set up frame synchronization among radio base stations without scaling up the system. Every time handover occurs, a mobile station has to set up frame synchronization with the TDMA frames being transmitted from a radio base station located in the new service area. Voice is interrupted until such frame synchronization has been established.

SUMMARY OF THE INVENTION

It is therefore an object of the present invention to provide a frame synchronization method among a plurality of radio base stations for a TDMA digital mobile communication system which prevents voice from being interrupted when a mobile station moves from one service area to another.

A TDMA frame synchronization system among a plurality of radio base stations of the present invention has a single control station governing a plurality of service areas, a plurality radio base stations each being situated in respective one of the service areas and each having a TDMA frame generator, and a plurality of mobile stations each being freely movable from one service station to another and a cable of interchanging digital signals with a particular radio base station situated in the service area where it is located. The system has synchronous signal generating means for transmitting a reset pulse for resetting the TDMA frame generators, and delaying means for delaying the transmitted reset pulse to cause it to reach all the radio base stations subordinate to the control station at the same time. The reset pulse outputted by the delaying means is applied to the TDMA frame generator of each radio base station. The reset pulse is sent every TDMA frame.

The delaying means has returning means for receiving the reset pulse and returning it immediately to the synchronous signal generating means as a return pulse. The synchronous signal generating means has time delay determining means for detecting a time when the return pulse is received and, on the basis of a period of time defined by the time when the reset pulse is transmitted and the time when it is received, determining a set time delay of the delaying means.

BRIEF DESCRIPTION OF THE DRAWINGS

The above-mentioned and other objects, features and advantages of the present invention will become more apparent by reference to the following detailed description of the invention taken in conjunction with the accompanying drawings, wherein:

FIG. 2, comprising

FIG. 3, comprising

FIG. 7 is a block diagram schematically showing a specific construction of a synchronous signal generator unit;

FIG. 8 is a block diagram schematically showing a specific construction of a radio base station;

DETAILED DESCRIPTION OF THE PREFERRED EMBODIMENT

Figure 1:
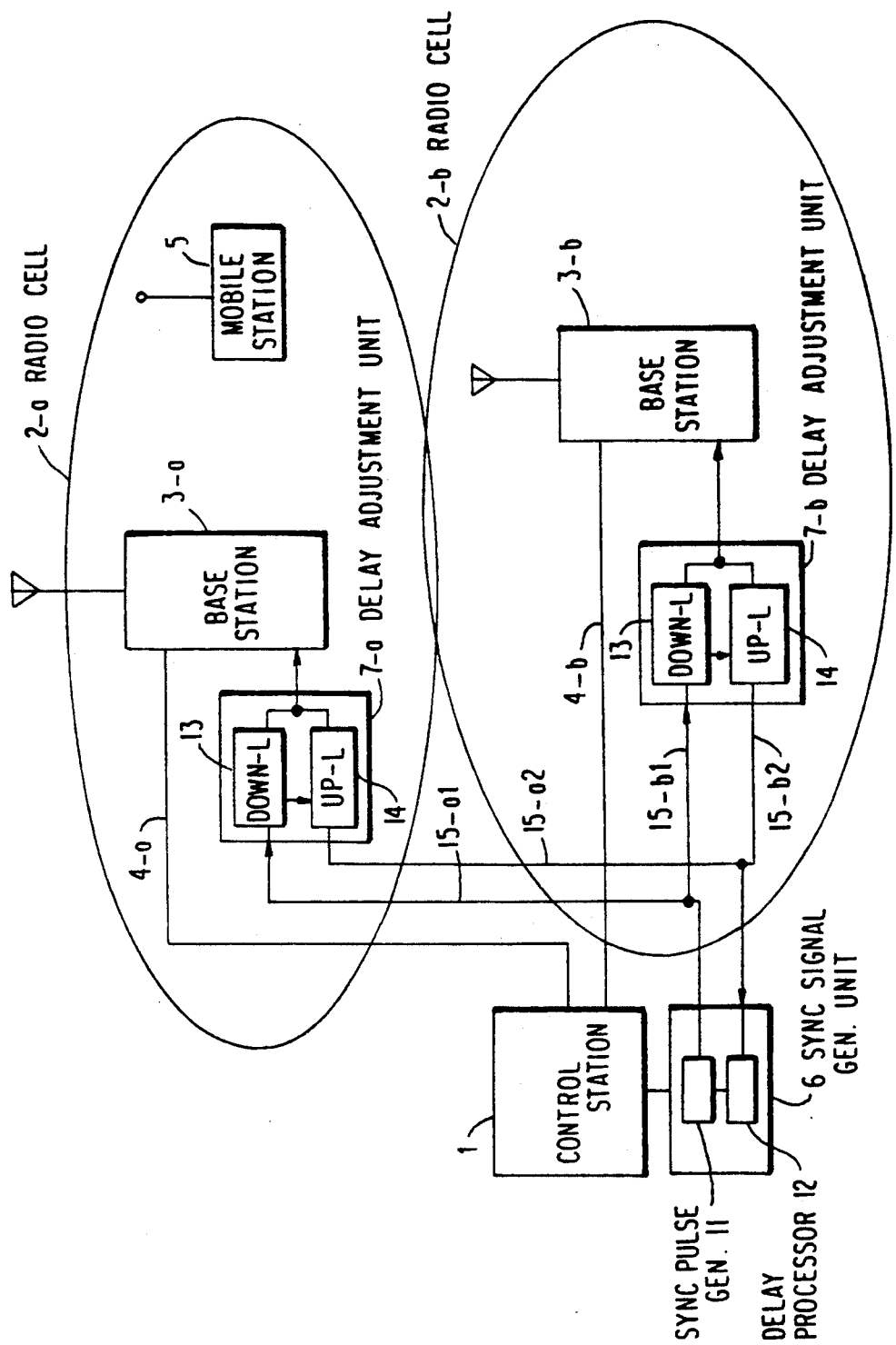
FIG. 1 is a block diagram schematically showing a frame synchronization system embodying the present invention.

Referring to FIG. 1 of the drawings, a TDMA mobile communications system has a single control station 1 which governs a plurality of service areas. In the figure, the service areas are represented by two service areas 2-a and 2-b for illustration. Radio base stations 3-a and 3-b are situated in the service areas 2-a and 2-b, respectively, to cover the associated areas. Communication cables 4-a and 4-b connect respectively the radio base stations 3-a and 3-b to the control station 1. Among a number of mobile stations, a given mobile station 5 holds a digital mobile communication with the control station 1 via the radio base station residing in the service area in which the mobile station 5 is located, e.g., the radio base station 3-$a$ of the service area 2-$a$ by using an assigned carrier and an assigned time slot. The mobile stations may be a portable type or a vehicle-mounted type.

When the mobile station 5 moves from the service area 2-$a$ to the service area 2-$b$ during communication, the communication is handed over to allow the mobile station 5 to communicate with the control station 1 via the radio base station 3-$b$ situated in the service area 2-$b$, instead of the base station 3-$a$.

Figure 2A:
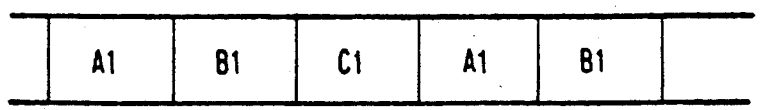
FIGS. 2A and 2B, shows a condition wherein TDMA frames being sent from nearby radio base stations are not synchronous.
Figure 2B:
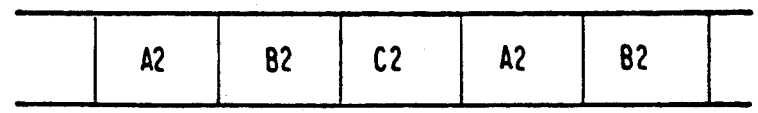
Figure 3A:
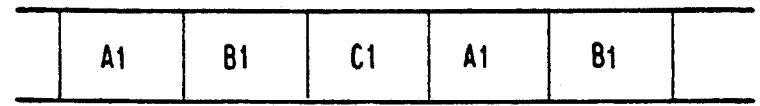
FIGS. 3A and 3B, shows a condition wherein TDMA frames being sent from nearby radio base stations are synchronous.
Figure 3B:
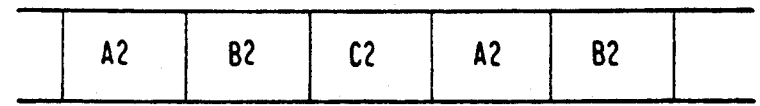

As shown in FIG. 2, assume that at the time of the hand-over the TDMA frames (represented by three frames A1, B1 and C1) being sent from the radio base station 3-$a$ and the TDMA frames (represented by A2, B2 and C2) being sent from the radio base station 3-$b$ are not synchronous. Then, the mobile station 5 entering the service area 2-$b$ has to set up frame synchronization with the radio base station 3-$b$ before restarting the communication. The frame synchronization causes the frames A1, B1 and C1 from the radio base station 3-$a$ and the frames A2, B2 and C2 from the radio base station 3-$b$ to coincide with each other, as shown in FIG. 3. For the frame synchronization, TDMA frame generators each being installed in respective one of the radio base stations 3 (here, 3-$a$ and 3-$b$) as will be described have to be reset to cause the transmission times of the frames from the individual TDMA frame generators into coincidence in less than the time in which a guard bit preceding each of the frames exists (eight bits; about 25 microseconds). During the frame synchronization, the communication is interrupted. Such interruption may reach 46 milliseconds, for example, under the GSM (Groupe Special Mobile) Recommendations due for launch in Europe in July 1991, because the Recommendations require a synchronization signal to be transmitted once in ten frames each of which has a time duration of 4.6 milliseconds.

In the embodiment shown in FIG. 1, a synchronous signal generator unit 6 is located in the vicinity of the control station 1, but it may be installed in the station 1. Time delay adjustment units 7-$a$ and 7-$b$ are situated in the vicinity of and connected to the radio base stations 3-$a$ and 3-$b$, respectively. The units 7-$a$ and 7-$b$ may also be installed in the base stations 3-$a$ and 3-$6$, respectively. The synchronous signal generator unit 6 and time delay adjustment units 7-$a$ and 7-$b$ cooperate to set up frame synchronization between the TDMA signals which the radio base stations 3-$a$ and 3-$b$ send. The synchronous signal generator unit 6 has a synchronous pulse generator 11 and a time delay processor 12. The time delay adjustment units 7-$a$ and 7-$b$ each has a down-link signal delay circuit 13 and an up-link signal delay circuit 14. The synchronous signal generator unit 6 is respectively connected to the radio base stations 3-$a$ and 3-$b$ by communication cables 15-a1 and 15-a2 and 15-b1 and 15-b2 and time delay adjustment units 7-$a$ and 7-$b$.

The operation of the embodiment regarding the synchronous signal generator unit 6 and time delay adjustment units 7-$a$ and 7-$b$ will be outlined below. The synchronous pulse generator 11 sends one pulse (transmission pulse) per TDMA frame for frame synchronization. The time delay adjustment units 7-$a$ and 7-$b$ each returns the transmission pulse as first and second return pulses, respectively, as will be described. On detecting the first and second return pulses, the time delay processor 12 determines first and second intervals between the transmission of the transmission pulse and the detection of the first and second pulses, respectively. With the first and second intervals, it is possible to determine first and second time delays between the control station 1 and the radio base stations 3-$a$ and 3-$b$, respectively. It is to be noted that most of the time delays is ascribable to the communication cables 15-a1, 15-a2, 15-b1 and 15-b2 or the communication cables 4$a$ and 4$b$ which are equivalent to the former. First and second set time delays to be set in the time delay adjustment units 7-$a$ and 7-$b$, respectively, are calculated and then set in the units 7-$a$ and 7-$b$. The time delay adjustment units 7-$a$ and 7-$b$ are manually or automatically controlled to set time delays thereof on the basis of the first and second set time delays, respectively, by the down-link signal delay circuit 13 and up-link signal delay circuit 14. This will be described in detail below. As a result, the time delay adjustment units 7-$a$ and 7-$b$ delay a down-link signal and an up-link signal.

Figure 4:
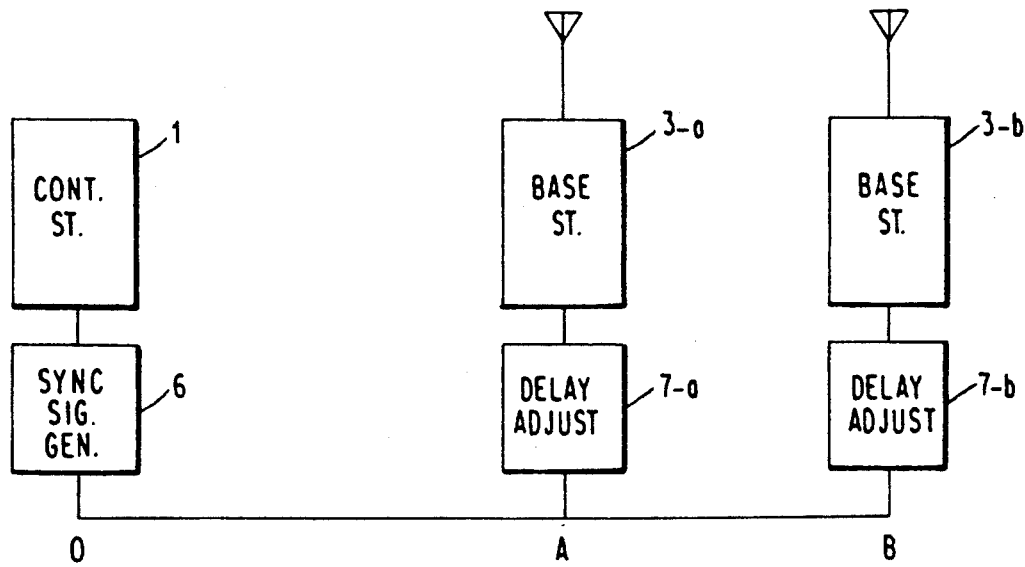
FIG. 4 is a diagram showing a positional relation of the control station and radio base stations to one another.

A reference will now be made to FIGS. 4 and 5 for explaining how time delays between the control station 1 and a plurality of radio base stations 3 (represented by base stations 3-$a$ and 3-$b$) are measured and how additional time delays for resetting a plurality of TDMA frame generators at the same time are set.

A procedure for measuring a time delay between the control station 1 and a given radio base station 3 will first be described. As shown in FIG. 4, assume that the synchronous signal generator unit 6 adjoining the control station 1 is located at a point O, the radio base station 3-$a$ and the associated time delay adjustment unit 7-$a$ are located at a point A, and the radio base station 3-$b$ and the associated time delay adjustment unit 7-$b$ are located at a point B. Referring also to FIG. 5, the procedure for setting the time delay of the point A, i.e., the time delay adjustment unit 7-$a$ begins with a step of setting the time delays of the down-link and up-link signal delay circuits 13 and 14 to zero. Then, the synchronous pulse generator 11 (point O) sends a transmission pulse, and this pulse is applied to the down-link signal delay circuit 13 (point A). The transmission pulse is returned from the up-link signal delay circuit 14 to the time delay processor 12 (point O) as a return pulse, as indicated by a dashed line in FIG. 5. The interval $t_a$ between the transmission of the transmission pulse and the detection of the return pulse is the reciprocation time delay between the points O and A (mainly ascribable to the communication cables 15-a1 and 15-a2). In the same manner, a reciprocation time delay $t_b$ between the points O and B is determined by detecting a return pulse from the time delay adjustment unit 7-$b$.

How additional time delays (set time delays) are set in the time delay adjustment units 7 will now be described. In order for the radio base stations 3-$a$ and 3-$b$ to set up frame synchronization, an arrangement should only be made such that the transmission pulse sent from the synchronous pulse generator 11 reaches the base stations 3-$a$ and 3-$b$ at the same time. For this purpose, time delays are set by a specific procedure as will be described below. The periods of time in which the time delay processor 12 receives return pulses from the time delay adjustment units 7-$a$ and 7-$b$ as measured from the time when the synchronous pulse generator 11 sent a transmission pulse both are set to be T (open to choice). An arrangement is made such that in a given time delay adjustment unit 7 the down-link and up-link signal delay circuits 13 and 14 have the same set time delay, and that a transmission pulse arrives at any of the radio base stations 3 in a period of time of T/2. Specifically, the time delay processor 12 determines a first set time delay $(T-t_a)$ and a second set time delay $(T-t_b)$ associated with the radio base stations 3-a and 3-b, respectively, on the basis of the measured time delays $t_a$ and $t_b$. The so determined set time delays $(T-t_a)$ and $(T-t_b)$ are provided to the control station 1 which in turn transmits these time delays $(T-t_a)$ and $(T-t_b)$ to the base stations 3-a and 3-b through the communications lines 4-a and 4-b, respectively. The time delays $(T-t_a)$ and $(T-t_b)$ may be displayed on a display, not shown, which may be provided on the synchronous pulse generator unit 6. The time delays $(T-t_a)$ and $(T-t_b)$ may also be respectively reported to the radio base stations 3-a and 3-b by telephone or similar implementation. In response to the time delays, the radio base stations 3-a and 3b set the set tube delays in the associated time delay adjustment units 7-a and 7-b. In the time delay adjustment unit 7-a, a time delay of $(T-t_a)/2$ is set in each of the down-link and up-link signal delay circuits 13 and 14. Likewise, in the time delay adjustment unit 7-b, a time delay of $(T-t_b)/2$ is set in each of the down-link and up-link signal delay circuits 13 and 14.

In the above condition, a transmission pulse from the synchronous pulse generator 11, i.e., a pulse sent from the point O is delayed by $(T-t_a)$ at the point A, delayed by $(T-t_b)$ at the point B, and then inputted as a return pulse to the point O, i.e., the time delay processor 12 in the time T.

The signal delay circuits 14 each is rendered inoperative as soon as the set time delay is set in the associated time delay adjustment unit 7-a or 7-b.

Figure 5:
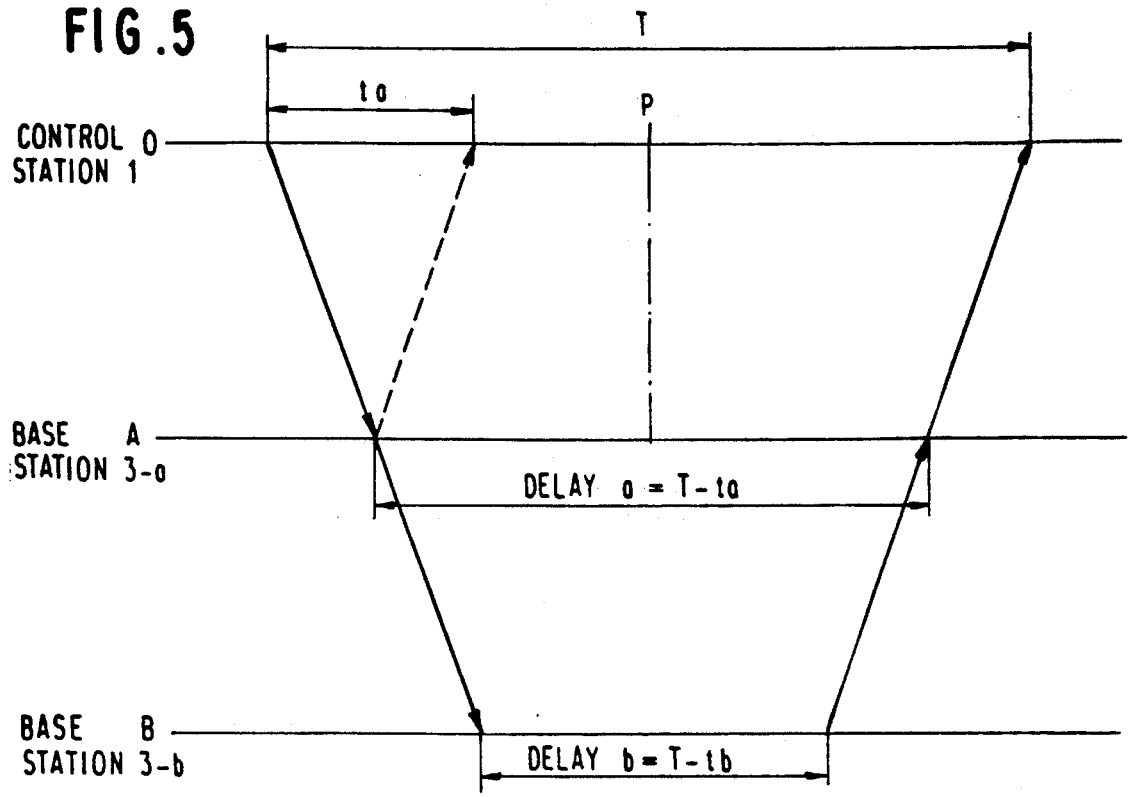
FIG. 5 is a chart demonstrating how a set time delay of each time delay adjustment unit is determined.

Once the set time delays are set in the individual time delay adjustment units 7-a and 7-b as stated above, a transmission pulse from the synchronous signal generator unit 6 arrives at the radio base stations 3-a and 3-b at the point P shown in FIG. 5, i.e., in the period of time of T/2 with no regard to the lengths of the communications cables 4 interconnecting the control station 1 and radio base stations 3. The radio base stations 3 each use the incoming transmission pulse for resetting a timing pulse generator. As a result, the mobile station is capable of establishing synchronization among the TDMA frames being transmitted from all of the radio base stations 3 instantaneously.

Figure 6:
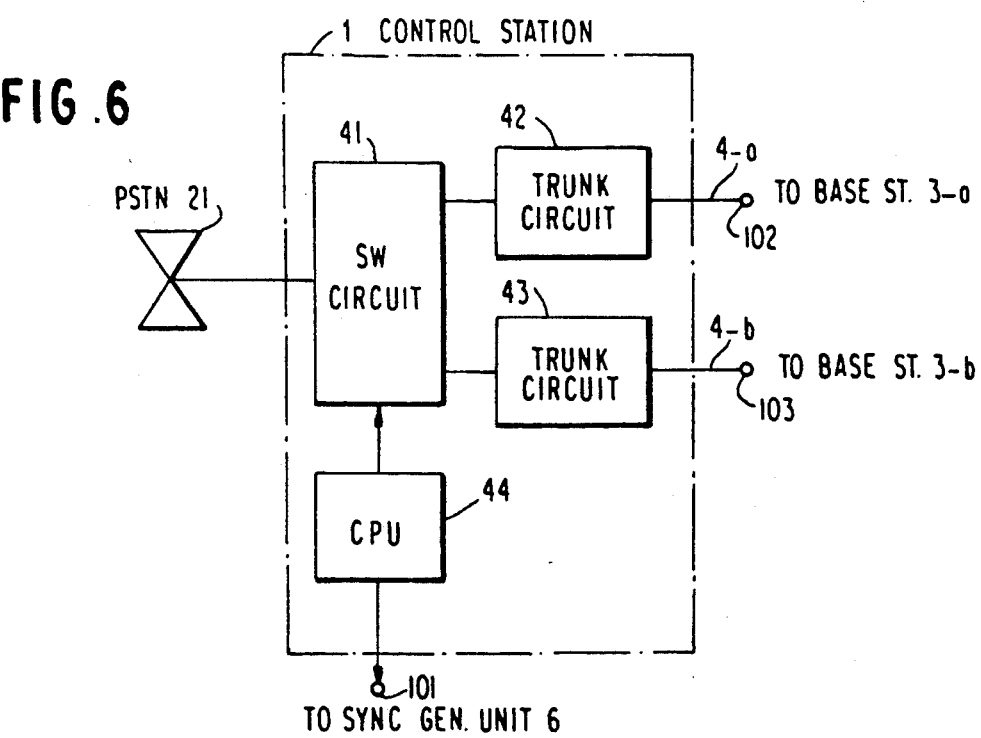
FIG. 6 is a block diagram schematically showing a specific construction of a control station.

Referring to FIG. 6, a specific construction of the control station 1 will now be described. As shown, the control station 1 is connected at one signal terminal to a public switching telephone network (PSTN) 21 and at the other signal terminals to the radio base stations 3-a and 3-b. A switching circuit 41 which is connected to a central processing unit (CPU) 44 governing the entire control station 1, performs the switching operation with respect to the mobile station 5. The switching circuit 41 is connected at one signal terminal to the PSTN 21 and at the other signal terminals to trunk circuits 42 and 43. The trunk circuits 42 and 43 are respectively connected to the radio base stations 3-a and 3-b by the communications cables 4-a and 4-b so as to transform signal codes into a transmission format which is agreed upon by the control station 1 and radio base stations 3-a and 3-b beforehand.

When the reciprocation time delays $t_a$ and $t_b$ are measured, the CPU 44 controls the base stations 3-a and 3-b to return a transmission pulse as a return pulse. At the time of setting the set time delays in the time delay adjustment units 7-a and 7-b, the CPU 44 sequentially sends to the base stations 3-a and 3-b the set time delays with control signals causing the base stations 3-a and 3-b to set the time delays in the units 7-a and 7-b, respectively.

The hand-over of communication that occurs after the time delays have been set in the time delay adjustment units 7-a and 7-b will now be described with reference to FIGS. 1 and 6. When the mobile station 5 is located in the service area 2-a, it holds a communication while setting up frame synchronization with the radio base station 3-a. In this condition, the switching circuit 41 of the control station 1 is connected to the trunk circuit 42. As the mobile station 5 approaches the service area 2-b, its communication is handed over from the service area 2-a to the service area 2-b and the station 5 starts communicating with the radio base station 3-b. At this instant, the switching circuit 41 is caused to connect with the trunk circuit 43. Since the time delay of the reset pulse (frame synchronizing pulse) between the control station 1 and the base station 3-a and the time delay of the reset pulse between the control station 1 and the base station 3-b are substantially equal, the mobile station 5 sets up frame synchronization with the base station 3-b immediately. Hence, the mobile station 5 can start communicating with the radio base station 3-b without the voice being interrupted.

It is noteworthy that the set time delays need only to be set once before the start of operation of the radio base stations 3 and do not have to be adjusted despite any possible changes in the communication conditions.

FIG. 7 shows a specific construction of the synchronous signal generator 6. As shown, the synchronous signal generator 6 has a signal generator 71 for generating a clock, and a counter 72 which divides the frequency of the clock to produce pulses whose period corresponds to one TDMA frame. A buffer circuit 73 converts the signal level of the output pulses of the counter 72 and delivers sequentially the resulting pulses to a plurality of down-link signal delay circuits 13 which are connected to the radio base stations. A buffer circuit 74 sequentially receives pulses (return pulses) coming in over a plurality of up-link signal delay circuits 14 which are also connected to the radio base stations 3. A counter 75 is reset by the output pulses of the counter 72 and counts time on the basis of the clock fed from the signal generator 71. A latch circuit 76 receives the time counted by the counter 75 and latches it in response to a pulse signal from the buffer circuit 74. The latched time is written to the CPU 44 of the control station 1. The signal generator 71, counter 72 and buffer circuit 73 constitute the synchronous pulse generator 11 while the buffer circuit 74, counter 75 and latch circuit 76 constitute the time delay processor 12.

A major function assigned to the synchronous signal generator unit 6 is to generate synchronous signal pulses (transmission pulses) having a one TDMA frame period and sending them to the time delay adjustment units 7. Another major function is to measure the delay times (pulse propagation times) between itself and the time delay adjustment units 7 on the basis of the pulse returned from the units 7 and to provide the results of measurement to the CPU 44 of the control station 1.

FIG. 8 shows a specific construction of the radio base station 3. As shown, the radio base station 3 has a trunk circuit 51 connected to the control station 1, a burst control circuit 52, a transceiver 53 connected to the burst control circuit 52, an antenna 54 connected to the transceiver 53 for transmitting and receiving a radio signal from the mobile station 5, a CPU 55 circuit for supervising the entire base station 3, a timing pulse generator 56, and a signal generator 57 for outputting a clock. The burst control circuit 52 transforms a voice signal from the trunk circuit 51 and signaling from the CPU 55 into burst pulses in response to timing pulses which are generated by the timing pulse generator 56, the burst pulses fed to the transceiver 53. A signal sent from the mobile station 5 and coming in through the antenna 54 is delivered to the trunk circuit 51 and CPU circuit 55 via the burst control circuit 52. The timing pulse generator 56 generates TDMA timing pulses in response to the clock from the signal generator 57. The timing pulse generator 56 is reset by a reset pulse (transmission pulse) sent from the synchronous signal generator 6 via the down-link delay circuit 13 and a terminal 303, whereby a plurality of radio base stations 3 are synchronized with respect to TDMA frames. The timing pulse generator 56 and burst control circuit 52 in combination play the role of the previously stated TDMA frame generator.

The CPU 55 is also connected to the delay adjustment unit 7 via a terminal 302 to control the unit 7. More specifically, the CPU 55 causes the unit 7 to return a transmission pulse to the synchronous signal generator unit 6 at the time of measuring the reciprocation time delay $t_a$ or $t_b$. When the set time delay is set, the CPU 55 sets the set time delay in the unit 7 in response to the control signal from the control station 1.

Figure 9:
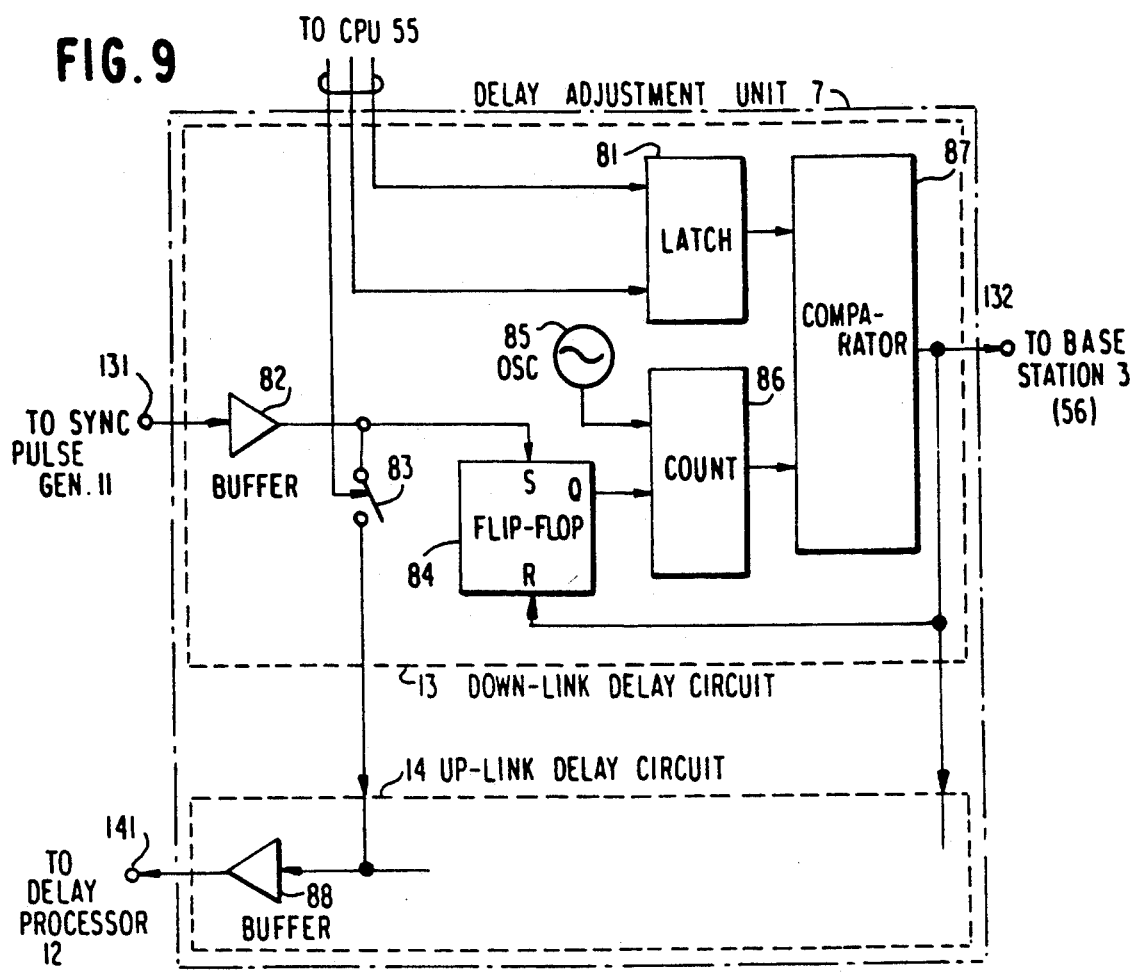
FIG. 9 is a block diagram showing a specific construction of a time delay adjustment unit.

Referring to FIG. 9, a specific construction of the time delay adjustment unit 7 having the down-link signal delay circuit 13 and up-link signal delay circuit 14 is shown. The down-link signal delay circuit 13 has a latch circuit 81 in which the CPU 55 of the associated radio base station 3, for example, writes a set time delay. A buffer circuit 82 receives a transmission pulse from the synchronous pulse generator 11. A switch 83 is connected to the buffer circuit 82 at one end thereof and under the control of CPU 55. A flip-flop 84 has a set input terminal to which a pulse from the buffer circuit 82 is applied. A signal generator 85 generates a clock. A counter 86 is reset by an output of the flip-flop 84 and counts time on the basis of the clock. A comparator 87 compares the increasing output of the counter 86 with the constant output of the latch circuit 81 and, when they coincide, produces a pulse. The output pulse of the comparator 87 is applied as a reset pulse to the reset input terminal of the flip-flop 84 and the timing pulse generator 56 of the associated radio base station 3. At the same time, the output pulse of the comparator 87 is fed to the up-link signal delay circuit 14 as a return pulse.

The up-link signal delay circuit 14 has a buffer circuit 88 which is connected to the other end of the switch 83 for returning a transmission pulse fed from the buffer circuit 82 to the synchronous pulse generator 11. This circuit 14, like the circuit 13, has a latch circuit, flip-flop, signal generator counter, and comparator, although not shown in the figure. On receiving the reset pulse or return pulse from the comparator 87 of the circuit 13, the circuit 14 delays it by a set time delay and sends the delayed pulse as a return pulse via the buffer circuit 88.

A major function of the time delay adjustment unit 7 is to return, at the time of measurement of a reciprocation time delay between the control station 1 and the radio base station 3, a transmission pulse from the synchronous signal generator 6 by way of the buffer circuits 82 and 88 and switch 83. Another major function is to delay a transmission pulse from the buffer circuit 82 by a set time delay and sending the delayed transmission pulse to the timing pulse generator 56 of the base station 3 via the comparator 87. Still another major function is to delay a transmission pulse from the comparator 87 by a set time delay and sending the delayed pulse as a return pulse to the time delay processor 12 which is connected to the output of the up-link signal delay circuit 14.

When a tramsmission pulse is applied to the flip-flop 84 of the time delay adjustment unit 7 via the buffer circuit 82, the counter 86 is set and starts counting the clock from the signal generator 85 while inputting the count to the comparator 87. The time delay measured at the time of time delay setting stage is stored in the latch circuit 81 beforehand by, for example, the CPU 55 of the radio base station 7. The comparator 87 compares the value of the latch circuit 81 and that of the counter 86 and, when they coincide, outputs a pulse. This pulse resets the TDMA timing pulse generator 56 of the base station 3 and the counter 86 via the flip-flop 84.

Figure 10:
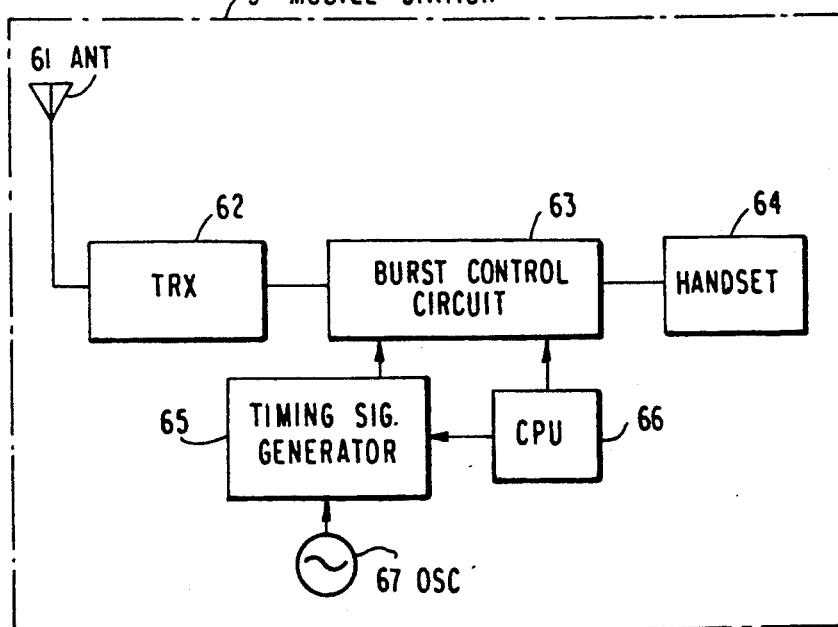
FIG. 10 is a block diagram schematically showing a specific construction of a mobile station.

As shown in FIG. 10, the mobile station 5 has an antenna 61 for transmitting and receiving TDMA signals from the radio base stations 30-$a$ and 3-$b$ over electromagnetic waves. The antenna 61 is connected to a transceiver 62 which is in turn connected to a burst control circuit 63. A handset 64 is connected to the burst control circuit 63 and interfaces the user to the mobile station 5. A timing pulse generator 65 is also connected to the burst control circuit 63. A CPU 66 is connected to the burst control circuit 63 and timing pulse generator 65 for supervising the entire mobile station 5. A signal generator 67 generates a clock. The burst control circuit 63 transforms a voice signal from the handset 64 and the signaling from the CPU 66 into bursts (frames) in response to timing pulses which are fed thereto from the timing pulse generator 65. These bursts are delivered to the transceiver 62. A signal sent from the mobile station 5 and come in through the antenna 61 is fed to the handset 64 and CPU 66. The timing pulse generator 65 generates TDMA timing pulses in response to the clock from the signal generator 67. The CPU 66 controls the timing pulse generator 65 in response to the TDMA frame synchronizing signals being sent from the radio base stations 3, thereby setting up frame synchronization between signals received from the base stations 3.

In summary, in accordance with the present invention, each radio base station has a time delay adjustment unit while a synchronous pulse generator is located in close proximity to a control station. The time delay adjustment units of the individual radio base stations delay a transmission pulse, or frame synchronizing pulse, sent from the synchronous pulse generator such that the pulse arrives at all of the base stations at the same time. This allows TDMA frame generators installed in the individual radio base stations to be reset at the same time, insuring TDMA frame synchronization among the base stations. Hence, a mobile station does not have to set up frame synchronization every time it is handed over from one service area to another. As a result, rapid hand-over of a mobile station is promoted, and the momentary cut-off of a signal is eliminated.

What is claimed is:

1. A TDMA digital mobile communications system comprising a control station, a plurality of radio base stations each being located in respective one of service areas which are governed by said control station and each comprising a TDMA frame generator, and a plurality of mobile stations each being movable in said service areas while interchanging digital signals with said radio base stations located in said service areas by using a given time slot, said system further comprising:
   synchronous signal generating means placed in or in the vicinity of said control station for transmitting a reset pulse to said base stations for resetting their TDMA frame generators;
   delaying means for delaying said transmitted reset pulse by a predetermined period of time, and inputting said delayed reset pulse to associated one of said radio base stations; and
   means for applying said reset pulse inputted from said delaying means to associated one of said TDMA frame generators;
   wherein a time delay assigned to each of said delaying means varies with a distance between said radio base station and said control station and is selected such that said reset pulse delayed by all of said radio base stations is inputted to all of said radio base stations at the same time; and
   wherein said delaying means comprises returning means for receiving said reset pulse and returning said reset pulse as a return pulse to said synchronous signal generating means, and wherein said synchronous signal generating means comprises time delay determining means for detecting a first time when said return pulse is received and, on the basis of a period of time defined by a second time when said reset pulse is transmitted and said first time when said reset pulse is received, determining a time delay of said reset pulse.

2. A TDMA digital mobile communications system comprising a control station, a plurality of radio base stations each being located in respective one of service areas which are governed by said control station and each comprising a TDMA frame generator, and a plurality of mobile stations each being movable in said service areas while interchanging digital signals with said radio base stations located in said service areas by using a given time slot, said system further comprising:
   synchronous signal generating means placed in or in the vicinity of said control station for transmitting a reset pulse to said base stations for resetting their TDMA frame generators;
   delaying means for delaying said transmitted reset pulse by a predetermined period of time, and inputting said delayed reset pulse to associated one of said radio base stations; and
   means for applying said reset pulse inputted from said delaying means to associated one of said TDMA frame generators; and
   wherein said synchronous signal generating means comprises:
     signal generator means for generating a clock;
     first counter means for dividing a frequency of said clock to generate a reset pulse having a period of one TDMA frame and transmitting said reset pulse to said delaying means;
     second counter means reset by said reset pulse fed from said first counter means for measuring a period of time until a return pulse of said reset pulse transmitted from said delaying means arrives by using said clock: and
     latch circuit means for latching said period of time measured by said second counter means.

3. A TDMA digital mobile communications system comprising a control station, a plurality of radio base stations each being located in respective one of service areas which are governed by said control station and each comprising a TDMA frame generator, and a plurality of mobile stations each being movable in said service areas while interchanging digital signals with said radio base stations located in said service areas by using a given time slot, said system further comprising:
   synchronous signal generating means placed in or in the vicinity of said control station for transmitting a reset pulse to said base stations for resetting their TDMA frame generators;
   delaying means for delaying said transmitted reset pulse by a predetermined period of time, and inputting said delayed reset pulse to associated one of said radio base stations; and
   means for applying said reset pulse inputted from said delaying means to associated one of said TDMA frame generators;
   wherein a time delay assigned to each of said delaying means varies with a distance between said radio base station and said control station and is selected such that said reset pulse delayed by all of said radio base stations is inputted to all of said radio base stations at the same time; and
   wherein said delaying means comprises:
     latch circuit means to which a set time delay is written via a set input terminal thereof;
     flip-flop means having a set input terminal for receiving said reset pulse;
     signal generator means for generating a clock;
     counter means reset by an output of said flip-flop means for counting time by using said clock signal; and
     comparator means for comparing the output of said latch circuit means and the output of said counter means and, when said outputs coincide, outputting a reset pulse while feeding said reset pulse to said flip-flop means as a reset pulse and to said radio base station as an output.

4. A TDMA digital mobile radio communications system comprising:
   a control station;
   synchronous signal generator means situated near or in said control station;
   a first and a second radio base station; and
   a first and a second time delay units situated near or in said first and second radio base stations, respectively;
   said synchronous signal generator comprising:
     signal generator means for generating a clock;
     first counter means for dividing a frequency of said clock signal to generate a reset pulse having a period of one TDMA frame;
     second counter means reset by said reset pulse outputted by said first counter means for measuring a period of time from said resetting to arrival of a return pulse of said reset pulse by using said clock; and
     latch circuit means for latching said period of time measured by said second counter means;
   said first and second time delay units each comprising:

latch circuit means to which a set time delay is written via a set input terminal thereof;

flip-flop means having a set input terminal for receiving a pulse signal;

signal generator means for generating a clock;

third counter means reset by an output of said flip-flop means for counting time by using said clock; and comparator means for comparing the output of said latch circuit means and the output of said third counter means and, when said outputs coincide, outputting a delayed pulse signal by delaying said pulse signal by said set time delay and feeding said delayed pulse signal to said flip-flop means as a reset pulse and to said radio base station as an output pulse.

5. A system as claimed in claim 4, wherein said reset pulse generated by said synchronous signal generator means is applied to said set input terminal of said flip-flop means over a communications cable, said output pulse produced by delaying said reset pulse being applied to said synchronous signal generator means over said communications cable.

6. A method of synchronizing Time Division Multiple Access (TDMA) frames transmitted to a mobile station from a plurality of base stations which are connected to a control station, comprising the steps of:

transmitting a first reset pulse from said control station to said base stations;

delaying the transmitted first reset pulse at said base stations by predetermined periods of time, respectively; and adjusting the transmission timings of said TDMA frames in response to the delayed reset pulses, respectively, to synchronize the TDMA frames;

further comprising the steps of:

transmitting a second reset pulse from said control station to said base stations;

returning the transmitted second reset pulse from respective base stations to said control station;

responsive to the returned second reset pulses, calculating delay times for which said second reset pulse propagates between said control station and said base stations, respectively, to produce measured time periods; and supplying said measured time periods to said base stations, respectively, as said predetermined periods of time.

* * * * *